(12) United States Patent
Fattal et al.

(10) Patent No.: US 10,838,134 B2
(45) Date of Patent: Nov. 17, 2020

(54) MULTIBEAM ELEMENT-BASED BACKLIGHT AND DISPLAY USING SAME

(71) Applicant: LEIA INC., Menlo Park, CA (US)

(72) Inventors: David A. Fattal, Mountain View, CA (US); Ming Ma, Palo Alto, CA (US); Xuejian Li, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 342 days.

(21) Appl. No.: 16/010,443

(22) Filed: Jun. 16, 2018

(65) Prior Publication Data
US 2018/0299608 A1   Oct. 18, 2018

Related U.S. Application Data

(63) Continuation of application No. PCT/US2016/036495, filed on Jun. 8, 2016.

(60) Provisional application No. 62/289,237, filed on Jan. 30, 2016.

(51) Int. Cl.
*F21V 8/00* (2006.01)
*H04N 13/302* (2018.01)

(52) U.S. Cl.
CPC ......... *G02B 6/0038* (2013.01); *G02B 6/0035* (2013.01); *G02B 6/0036* (2013.01); *H04N 13/302* (2018.05); *G02B 6/0061* (2013.01)

(58) Field of Classification Search
CPC ............................ G02B 6/0038; G02B 5/1866
See application file for complete search history.

(56) References Cited

U.S. PATENT DOCUMENTS

| | | |
|---|---|---|
| 4,711,512 A | 12/1987 | Upatnieks |
| 8,384,861 B2 | 2/2013 | Jepsen |
| 9,063,382 B2 | 6/2015 | Kim |
| 9,128,226 B2 | 9/2015 | Fattal et al. |
| 9,201,270 B2 | 12/2015 | Fattal et al. |
| 9,298,168 B2 | 3/2016 | Taff et al. |
| 9,389,415 B2 | 7/2016 | Fattal et al. |
| 9,459,461 B2 | 10/2016 | Santori et al. |
| 9,785,119 B2 | 10/2017 | Taff et al. |

(Continued)

FOREIGN PATENT DOCUMENTS

| | | |
|---|---|---|
| CN | 104460115 A | 3/2015 |
| JP | 2010243941 A | 10/2010 |

(Continued)

OTHER PUBLICATIONS

International Search Report (ISR) by International Searching Authority (ISA) Korean Intellectual Property Office (KIPO) dated Oct. 20, 2016 (3 pages) for counterpart PCT Application PCT/US2016/036495.

(Continued)

*Primary Examiner* — Evan P Dzierzynski
*Assistant Examiner* — Keith G. Delahoussaye
(74) *Attorney, Agent, or Firm* — J. Michael Johnson (57) ABSTRACT

A multiview backlight and a multiview display employ multibeam elements configured to provide a plurality of light beams having different principal angular directions corresponding to different view directions of the multiview display. The display includes multiview pixels that include sub-pixels. A size of the multibeam element is comparable to a size of a sub-pixel in a multiview pixel of the multiview display.

18 Claims, 7 Drawing Sheets

(56) References Cited

U.S. PATENT DOCUMENTS

| | | |
|---|---|---|
| 9,791,701 B2 | 10/2017 | Ato et al. |
| 2002/0141056 A1 | 10/2002 | Kobayashi et al. |
| 2003/0058209 A1 | 3/2003 | Balogh |
| 2008/0150936 A1 | 6/2008 | Karman |
| 2009/0040426 A1 | 2/2009 | Mather et al. |
| 2010/0141868 A1* | 6/2010 | St. Hilaire ............ G02B 6/0061 349/62 |
| 2011/0122467 A1 | 5/2011 | Futterer et al. |
| 2011/0141395 A1 | 6/2011 | Yashiro |
| 2011/0310233 A1 | 12/2011 | Bathiche et al. |
| 2012/0038986 A1 | 2/2012 | Pesach |
| 2012/0127751 A1 | 5/2012 | Kimmel |
| 2012/0195072 A1 | 8/2012 | Minami |
| 2012/0212486 A1 | 8/2012 | Van Der Horst et al. |
| 2013/0169694 A1* | 7/2013 | Chen .................... G02B 6/0035 345/690 |
| 2013/0286170 A1 | 10/2013 | Qin et al. |
| 2013/0329301 A1 | 12/2013 | Travis |
| 2014/0247330 A1 | 9/2014 | Baik et al. |
| 2015/0016777 A1 | 1/2015 | Abovitz et al. |
| 2015/0138457 A1 | 5/2015 | Kroon |
| 2015/0226965 A1 | 8/2015 | Kim et al. |
| 2015/0355403 A1 | 12/2015 | Santori |
| 2016/0320620 A1 | 11/2016 | Maimone |
| 2017/0363794 A1 | 12/2017 | Wan et al. |
| 2018/0011237 A1 | 1/2018 | Fattal |

FOREIGN PATENT DOCUMENTS

| | | |
|---|---|---|
| TW | 594054 B | 6/2004 |
| TW | 201013260 A | 4/2010 |
| TW | 201218179 A | 5/2012 |
| TW | 201506473 A | 2/2015 |
| WO | 2011088615 A1 | 7/2011 |
| WO | 2012038856 A1 | 3/2012 |
| WO | 2014051623 A1 | 4/2014 |
| WO | 2015016844 A1 | 2/2015 |
| WO | 2016018314 A1 | 2/2016 |
| WO | 2017041079 A1 | 3/2017 |
| WO | 2017204840 A1 | 11/2017 |
| WO | 2017213676 A1 | 12/2017 |

OTHER PUBLICATIONS

Search Report from Taiwan Intellectual Property Office (TIPO) (1 page) with English translation (1 page) dated Oct. 30, 2017 for foreign counterpart TW application No. 106114658 to parent PCT/US2016/036495.

Fattal, David et al., "A multi-directional backlight for a wide-angle, glasses-free three-dimensional display," Nature, Mar. 21, 2013, pp. 348-351, vol. 495, Macmillan Publishers Limited, 2013.

Maimone, A., et al., Pinlight Displays: Wide Field of View Augmented Reality Eyeglasses using Defocused Point Light Sources, ACM Transactions on Graphics, Jul. 2014, pp. 89.1-89.11, vol. 33, No. 4, Article 89.

Chun-Wei Liu, et al., Sub-wavelength gratings fabricated on a light bar by roll-to-roll UV embossing process, Optics Express, Jun. 6, 2011, pp. 11299-11311, vol. 19, No. 12.

* cited by examiner

MULTIBEAM ELEMENT-BASED BACKLIGHT AND DISPLAY USING SAME

CROSS-REFERENCE TO RELATED APPLICATIONS

This application is a continuation patent application of and claims the benefit of priority to International Application No. PCT/US2016/036495, filed Jun. 8, 2016, which claims priority to U. S. Provisional Patent Application Ser. No. 62/289,237, filed Jan. 30, 2016, the entirety of both is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a multiview or three-dimensional (3D) display and a multiview backlight with application to the multiview display. In particular, embodiments consistent with the principles described herein provide a multiview backlight employing multibeam elements configured to provide light beams having a plurality of different principal angular directions. Further, according to various embodiments, the multibeam elements are sized relative to sub-pixels of a multiview pixel in a multiview display, and may also be spaced apart from one another in a manner corresponding to a spacing of multiview pixels in the multiview display. According to various embodiments, the different principal angular directions of the light beams provided by the multibeam elements of the multiview backlight correspond to different directions of various different views of the multiview display, according to various embodiments.

Figure 1A:
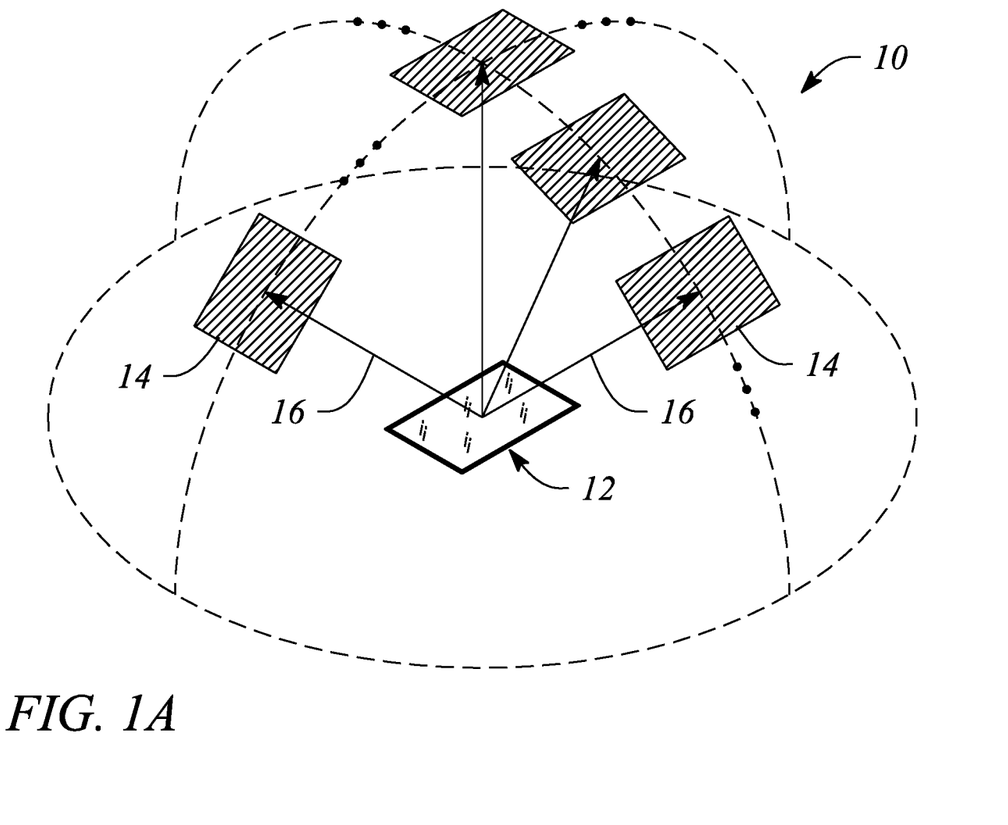
FIG. 1A illustrates a perspective view of a multiview display in an example, according to an embodiment consistent with the principles described herein.

Herein, a 'multiview display' is defined as an electronic display or display system configured to provide different views of a multiview image in different view directions. FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

Figure 1B:
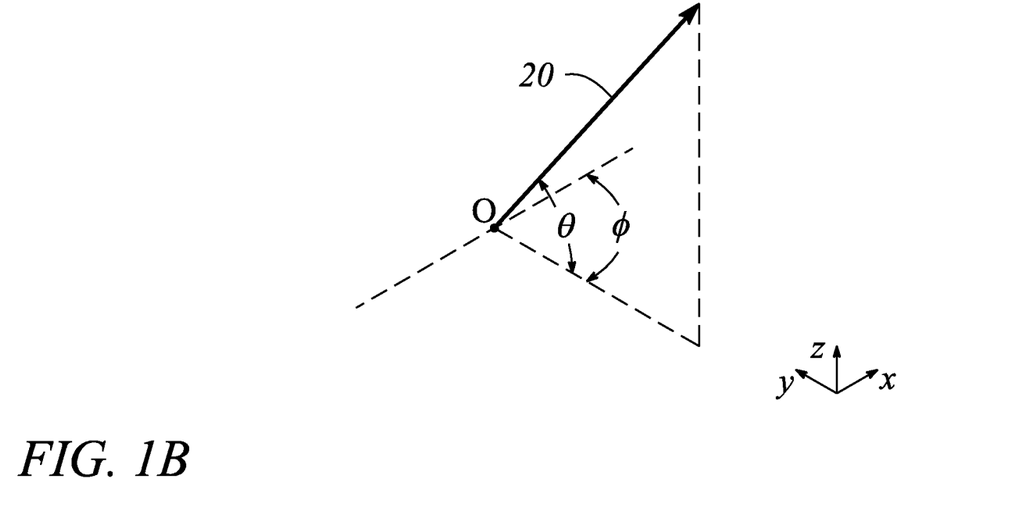
FIG. 1B illustrates a graphical representation of angular components of a light beam having a particular principal angular direction corresponding to a view direction of a multiview display in an example, according to an embodiment consistent with the principles described herein.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane). FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of sub-pixels representing 'view' pixels in each of a similar plurality of different views of a multiview display. In particular, a multiview pixel may have an individual sub-pixel corresponding to or representing a view pixel in each of the different views of the multiview image. Moreover, the sub-pixels of the multiview pixel are so-called 'directional pixels' in that each of the sub-pixels is associated with a predetermined view direction of a corresponding one of the different views, by definition herein. Further, according to various examples and embodiments, the different view pixels represented by the sub-pixels of a multiview pixel may have equivalent or at least substantially similar locations or coordinates in each of the different views. For example, a first multiview pixel may have individual sub-pixels corresponding to view pixels located at $\{x_1, y_1\}$ in each of the different views of a multiview image, while a second multiview pixel may have individual sub-pixels corresponding to view pixels located at $\{x_2, y_2\}$ in each of the different views, and so on.

In some embodiments, a number of sub-pixels in a multiview pixel may be equal to a number of views of the multiview display. For example, the multiview pixel may provide sixty-four (64) sub-pixels in associated with a multiview display having 64 different views. In another example, the multiview display may provide an eight by four array of views (i.e., 32 views) and the multiview pixel may include thirty-two 32 sub-pixels (i.e., one for each view). Additionally, each different sub-pixel may have an associated direction (e.g., light beam principal angular direction) that corresponds to a different one of the view directions corresponding to the 64 different views, for example. Further, according to some embodiments, a number of multiview pixels of the multiview display may be substantially equal to a number of 'view' pixels (i.e., pixels that make up a selected view) in the multiview display views. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n \sin \theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
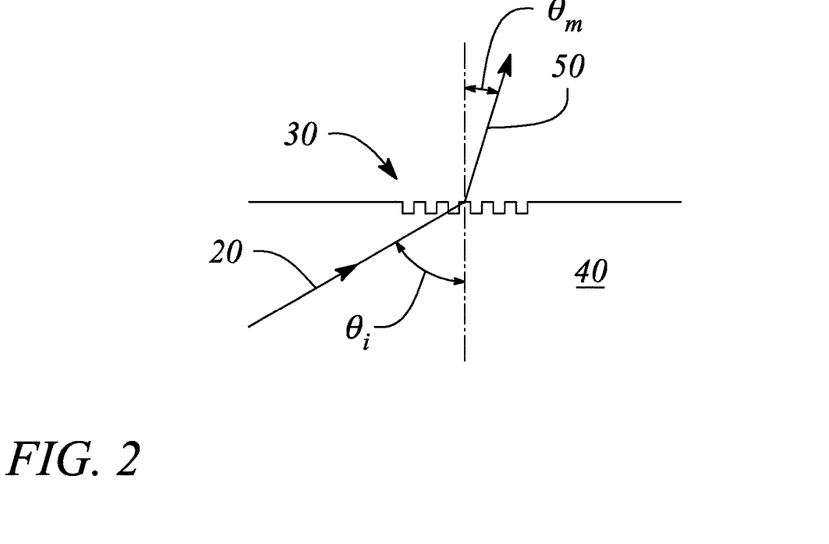
FIG. 2 illustrates a cross sectional view of a diffraction grating in an example, according to an embodiment consistent with the principles described herein.

FIG. 2 illustrates a cross sectional view of a diffraction grating 30 in an example, according to an embodiment consistent with the principles described herein. For example, the diffraction grating 30 may be located on a surface of a light guide 40. In addition, FIG. 2 illustrates a light beam 20 incident on the diffraction grating 30 at an incident angle $\theta_i$. The light beam 20 is a guided light beam within the light guide 40. Also illustrated in FIG. 2 is a coupled-out light beam 50 diffractively produced and coupled-out by the diffraction grating 30 as a result of diffraction of the incident light beam 20. The coupled-out light beam 50 has a diffraction angle $\theta_m$ (or 'principal angular direction' herein) as given by equation (1). The coupled-out light beam 50 may correspond to a diffraction order 'm' of the diffraction grating 30, for example.

By definition herein, a 'multibeam element' is a structure or element of a backlight or a display that produces light that includes a plurality of light beams. In some embodiments, the multibeam element may be optically coupled to a light guide of a backlight to provide the light beams by coupling out a portion of light guided in the light guide. In other embodiments, the multibeam element may generate light emitted as the light beams (e.g., may comprise a light source). Further, the light beams of the plurality of light beams produced by a multibeam element have different principal angular directions from one another, by definition herein. In particular, by definition, a light beam of the plurality has a predetermined principal angular direction that is different from another light beam of the light beam plurality. Furthermore, the light beam plurality may represent a light field. For example, the light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field. According to various embodiments, the different principal angular directions of the various light beams are determined by a characteristic including, but not limited to, a size (e.g., length, width, area, etc.) of the multibeam element. In some embodiments, the multibeam element may be considered an 'extended point light source', i.e., a plurality of point light sources distributed across an extent of the multibeam element, by definition herein. Further, a light beam produced by the multibeam element has a principal angular direction given by angular components $\{\theta, \phi\}$, by definition herein, and as described above with respect to FIG. 1B.

Herein a 'collimator' is defined as substantially any optical device or apparatus that is configured to collimate light. For example, a collimator may include, but is not limited to, a collimating mirror or reflector, a collimating lens, and various combinations thereof. In some embodiments, the collimator comprising a collimating reflector may have a reflecting surface characterized by a parabolic curve or shape. In another example, the collimating reflector may comprise a shaped parabolic reflector. By 'shaped parabolic' it is meant that a curved reflecting surface of the shaped parabolic reflector deviates from a 'true' parabolic curve in a manner determined to achieve a predetermined reflection characteristic (e.g., a degree of collimation). Similarly, a collimating lens may comprise a spherically shaped surface (e.g., a biconvex spherical lens).

In some embodiments, the collimator may be a continuous reflector or a continuous lens (i.e., a reflector or lens having a substantially smooth, continuous surface). In other embodiments, the collimating reflector or the collimating lens may comprise a substantially discontinuous surface such as, but not limited to, a Fresnel reflector or a Fresnel lens that provides light collimation. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., $+/-\sigma$ degrees about a central or principal angular direction of the collimated light beam). The light rays of the collimated light beam may have a Gaussian distribution in terms of angle and the angular spread be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Further, as used herein, the article 'a' is intended to have its ordinary meaning in the patent arts, namely 'one or more'. For example, 'a multibeam element' means one or more multibeam elements and as such, 'the multibeam element' means 'the multibeam element(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
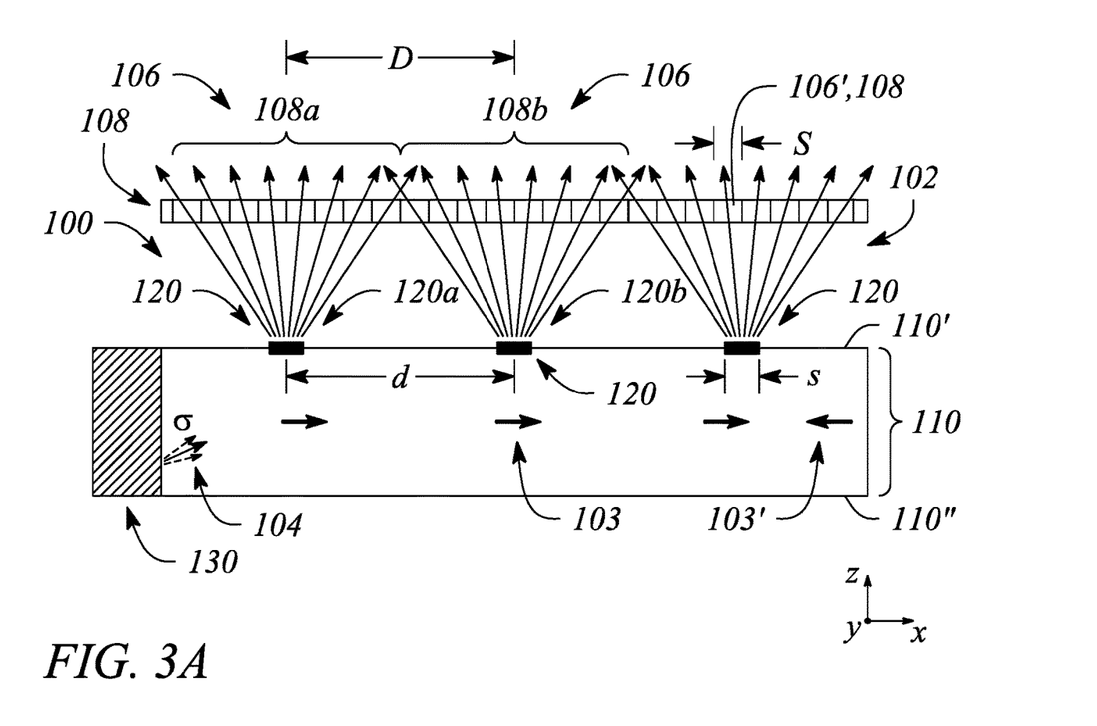
FIG. 3A illustrates a cross sectional view of a multiview backlight in an example, according to an embodiment consistent with the principles described herein.
Figure 3B:
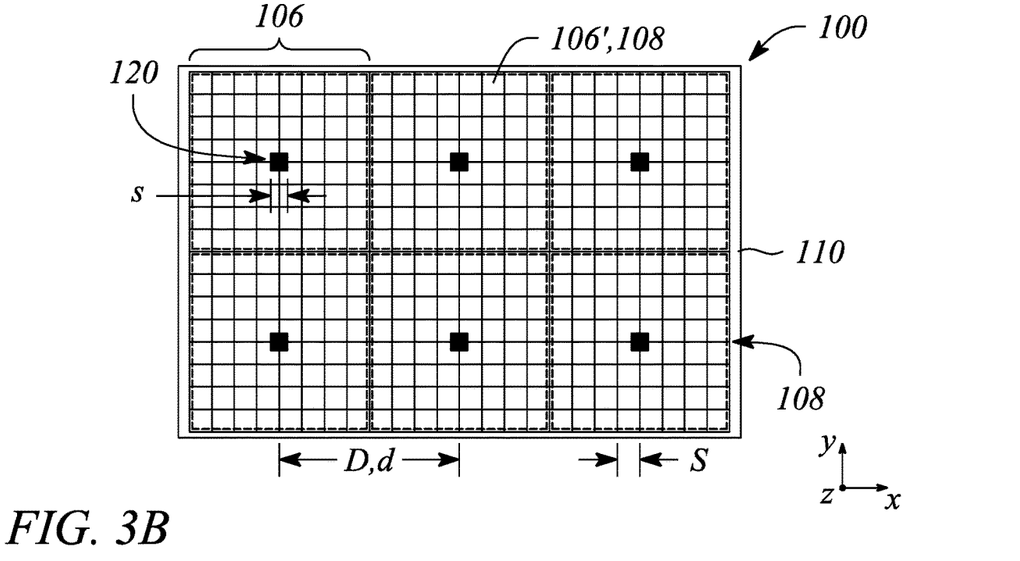
FIG. 3B illustrates a plan view of a multiview backlight in an example, according to an embodiment consistent with the principles described herein.
Figure 3C:
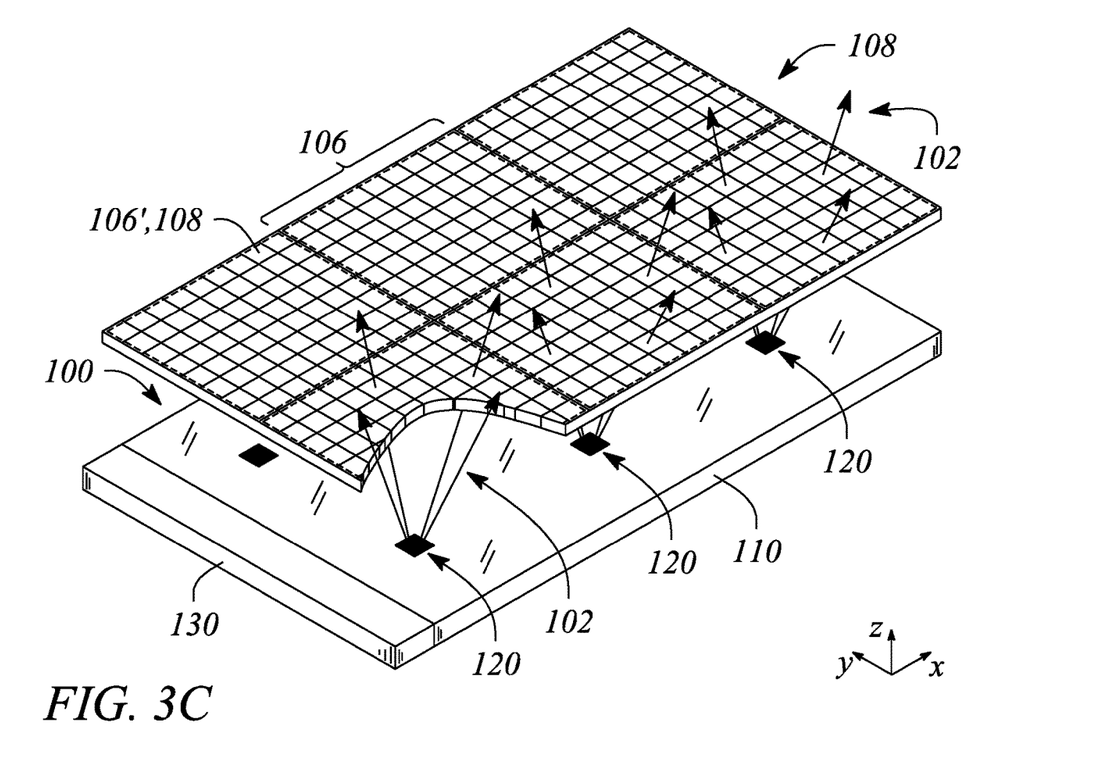
FIG. 3C illustrates a perspective view of a multiview backlight of in an example, according to an embodiment consistent with the principles described herein.

According to some embodiments of the principles described herein, a multiview backlight is provided. FIG. 3A illustrates a cross sectional view of a multiview backlight 100 in an example, according to an embodiment consistent with the principles described herein. FIG. 3B illustrates a plan view of a multiview backlight 100 in an example, according to an embodiment consistent with the principles described herein. FIG. 3C illustrates a perspective view of a multiview backlight 100 in an example, according to an embodiment consistent with the principles described herein. The perspective view in FIG. 3C is illustrated with a partial cut-away to facilitate discussion herein only.

The multiview backlight 100 illustrated in FIGS. 3A-3C is configured to provide a plurality of coupled-out light beams 102 having different principal angular directions from one another (e.g., as a light field). In particular, the provided plurality of coupled-out light beams 102 are directed away from the multiview backlight 100 in different principal angular directions corresponding to respective view directions of a multiview display, according to various embodiments. In some embodiments, the coupled-out light beams 102 may be modulated (e.g., using light valves, as described below) to facilitate the display of information having 3D content.

As illustrated in FIGS. 3A-3C, the multiview backlight 100 comprises a light guide 110. The light guide 110 may be a plate light guide 110, according to some embodiments. The light guide 110 is configured to guide light along a length of the light guide 110 as guided light 104. For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In some embodiments, the light guide 110 may be a slab or plate optical waveguide comprising an extended, substantially planar sheet of optically transparent, dielectric material. The substantially planar sheet of dielectric material is configured to guide the guided light beam 104 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples.

Further, according to some embodiments, the light guide 110 is configured to guide the guided light beam 104 according to total internal reflection at a non-zero propagation angle between a first surface 110' (e.g., 'front' surface or side) and a second surface 110" (e.g., 'back' surface or side) of the light guide 110. In particular, the guided light beam 104 propagates by reflecting or 'bouncing' between the first surface 110' and the second surface 110" of the light guide 110 at the non-zero propagation angle. In some embodiments, a plurality of guided light beams 104 comprising different colors of light may be guided by the light guide 110 at respective ones of different color-specific, non-zero propagation angles. Note, the non-zero propagation angle is not illustrated in FIGS. 3A-3C for simplicity of illustration. However, a bold arrow depicting a propagation direction 103 illustrates a general propagation direction of the guided light 104 along the light guide length in FIG. 3A.

As defined herein, a 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. For example, the non-zero propagation angle of the guided light beam 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees. Moreover, a specific non-zero propagation angle may be chosen (e.g., arbitrarily) for a particular implementation as long as the specific non-zero propagation angle is chosen to be less than the critical angle of total internal reflection within the light guide 110.

The guided light beam 104 in the light guide 110 may be introduced or coupled into the light guide 110 at the non-zero propagation angle (e.g., about 30-35 degrees). One or more of a lens, a mirror or similar reflector (e.g., a tilted collimating reflector), and a prism (not illustrated) may facilitate coupling light into an input end of the light guide 110 as the guided light beam 104 at the non-zero propagation angle, for example. Once coupled into the light guide 110, the guided light beam 104 propagates along the light guide 110 in a direction that may be generally away from the input end (e.g., illustrated by bold arrows pointing along an x-axis in FIG. 3A).

Further, the guided light 104 or equivalently the guided light beam 104 produced by coupling light into the light guide 110 may be a collimated light beam, according to various embodiments. Herein, a 'collimated light' or 'collimated light beam' is generally defined as a beam of light in which rays of the light beam are substantially parallel to one another within the light beam (e.g., the guided light beam 104). Further, rays of light that diverge or are scattered from the collimated light beam are not considered to be part of the collimated light beam, by definition herein. In some embodiments, the multiview backlight 100 may include a collimator, such as a lens, reflector or mirror, as described above, (e.g., tilted collimating reflector) to collimate the light, e.g., from a light source. In some embodiments, the light source comprises a collimator. The collimated light provided to the light guide 110 is a collimated guided light beam 104. The guided light beam 104 may be collimated according to or having a collimation factor, as described above, in various embodiments.

In some embodiments, the light guide 110 may be configured to 'recycle' the guided light 104. In particular, the guided light 104 that has been guided along the light guide length may be redirected back along that length in another propagation direction 103' that differs from the propagation direction 103. For example, the light guide 110 may include a reflector (not illustrated) at an end of the light guide 110 opposite to an input end adjacent to the light source. The reflector may be configured to reflect the guided light 104 back toward the input end as recycled guided light. Recycling guided light 104 in this manner may increase a brightness of the multiview backlight 100 (e.g., an intensity of the coupled-out light beams 102) by making guided light available more than once, for example, to multibeam elements, described below.

In FIG. 3A, a bold arrow indicating a propagation direction 103' of recycled guided light (e.g., directed in a negative x-direction) illustrates a general propagation direction of the recycled guided light within the light guide 110. Alternatively (e.g., as opposed to recycling guided light), guided light 104 propagating in the other propagation direction 103' may be provided by introducing light into the light guide 110 with the other propagation direction 103' (e.g., in addition to guided light 104 having the propagation direction 103).

As illustrated in FIGS. 3A-3C, the multiview backlight 100 further comprises a plurality of multibeam elements 120 spaced apart from one another along the light guide length. In particular, the multibeam elements 120 of the plurality are separated from one another by a finite space and represent individual, distinct elements along the light guide length. That is, by definition herein, the multibeam elements 120 of the plurality are spaced apart from one another according to a finite (i.e., non-zero) inter-element distance (e.g., a finite center-to-center distance). Further the multibeam elements 120 of the plurality generally do not intersect, overlap or otherwise touch one another, according to some embodiments. That is, each multibeam element 120 of the plurality is generally distinct and separated from other ones of the multibeam elements 120.

According to some embodiments, the multibeam elements 120 of the plurality may be arranged in either a one-dimensional (1D) array or two-dimensional (2D) array. For example, the plurality of multibeam elements 120 may be arranged as a linear 1D array. In another example, the plurality of multibeam elements 120 may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the multibeam elements 120 may be substantially uniform or constant across the array. In other examples, the inter-element distance between the multibeam elements 120 may be varied one or both of across the array and along the length of the light guide 110.

According to various embodiments, a multibeam element 120 of the plurality is configured to couple out a portion of the guided light 104 as the plurality of coupled-out light beams 102. In particular, FIGS. 3A and 3C illustrate the coupled-out light beams 102 as a plurality of diverging arrows depicted as being directed way from the first (or front) surface 110' of the light guide 110. Further, a size of the multibeam element 120 is comparable to a size of a sub-pixel 106' in a multiview pixel 106, as defined above, of a multiview display, according to various embodiments. The multiview pixels 106 are illustrated in FIGS. 3A-3C with the multiview backlight 100 for the purpose of facilitating discussion. Herein, the 'size' may be defined in any of a variety of manners to include, but not be limited to, a length, a width or an area. For example, the size of a sub-pixel 106' may be a length thereof and the comparable size of the multibeam element 120 may also be a length of the multibeam element 120. In another example, size may refer to an area such that an area of the multibeam element 120 may be comparable to an area of the sub-pixel 106'.

In some embodiments, the size of the multibeam element 120 is comparable to the sub-pixel size such that the multibeam element size is between about fifty percent (50%) and about two hundred percent (200%) of the sub-pixel size. For example, if the multibeam element size is denoted 's' and the sub-pixel size is denoted 'S' (e.g., as illustrated in FIG. 3A), then the multibeam element size s may be given by equation (2) as $$\frac{1}{2}S \le s \le 2S \qquad (2)$$

In other examples, the multibeam element size is greater than about sixty percent (60%) of the sub-pixel size, or about seventy percent (70%) of the sub-pixel size, or greater than about eighty percent (80%) of the sub-pixel size, or greater than about ninety percent (90%) of the sub-pixel size, and the multibeam element is less than about one hundred eighty percent (180%) of the sub-pixel size, or less than about one hundred sixty percent (160%) of the sub-pixel size, or less than about one hundred forty percent (140%) of the sub-pixel size, or less than about one hundred twenty percent (120%) of the sub-pixel size. For example, by 'comparable size', the multibeam element size may be between about seventy-five percent (75%) and about one hundred fifty (150%) of the sub-pixel size. In another example, the multibeam element 120 may be comparable in size to the sub-pixel 106' where the multibeam element size is between about one hundred twenty-five percent (125%) and about eighty-five percent (85%) of the sub-pixel size. According to some embodiments, the comparable sizes of the multibeam element 120 and the sub-pixel 106' may be chosen to reduce, or in some examples to minimize, dark zones between views of the multiview display, while at the same time reducing, or in some examples minimizing, an overlap between views of the multiview display.

FIGS. 3A-3C further illustrate an array of light valves 108 configured to modulate the coupled-out light beams 102 of the coupled-out light beam plurality. The light valve array may be part of a multiview display that employs the multiview backlight, for example, and is illustrated in FIGS. 3A-3C along with the multiview backlight 100 for the purpose of facilitating discussion herein. In FIG. 3C, the array of light valves 108 is partially cut-away to allow visualization of the light guide 110 and the multibeam element 120 underlying the light valve array.

As illustrated in FIGS. 3A-3C, different ones of the coupled-out light beams 102 having different principal angular directions pass through and may be modulated by different ones of the light valves 108 in the light valve array. Further, as illustrated, a light valve 108 of the array corresponds to a sub-pixel 106', and a set of the light valves 108 corresponds to a multiview pixel 106 of a multiview display. In particular, a different set of light valves 108 of the light valve array is configured to receive and modulate the coupled-out light beams 102 from different ones of the multibeam elements 120, i.e., there is one unique set of light valves 108 for each multibeam element 120, as illustrated. In various embodiments, different types of light valves may be employed as the light valves 108 of the light valve array including, but not limited to, one or more of liquid crystal light valves, electrophoretic light valves, and light valves based on electrowetting.

As illustrated in FIG. 3A, a first light valve set 108a is configured to receive and modulate the coupled-out light beams 102 from a first multibeam element 120a, while a second light valve set 108b is configured to receive and modulate the coupled-out light beams 102 from a second multibeam element 120b. Thus, each of the light valve sets (e.g., the first and second light valve sets 108a, 108b) in the light valve array corresponds, respectively, to a different multiview pixel 106, with individual light valves 108 of the light valve sets corresponding to the sub-pixels 106' of the respective multiview pixels 106, as illustrated in FIG. 3A.

Note that, as illustrated in FIG. 3A, the size of a sub-pixel 106' may correspond to a size of a light valve 108 in the light valve array. In other examples, the sub-pixel size may be defined as a distance (e.g., a center-to-center distance) between adjacent light valves 108 of the light valve array. For example, the light valves 108 may be smaller than the center-to-center distance between the light valves 108 in the light valve array. The sub-pixel size may be defined as either the size of the light valve 108 or a size corresponding to the center-to-center distance between the light valves 108, for example.

In some embodiments, a relationship between the multibeam elements 120 of the plurality and corresponding multiview pixels 106 (e.g., sets of light valves 108) may be a one-to-one relationship. That is, there may be an equal number of multiview pixels 106 and multibeam elements 120. FIG. 3B explicitly illustrates by way of example the one-to-one relationship where each multiview pixel 106 comprising a different set of light valves 108 is illustrated as surrounded by a dashed line. In other embodiments (not illustrated), the number of multiview pixels 106 and multibeam elements 120 may differ from one another.

In some embodiments, an inter-element distance (e.g., center-to-center distance) between a pair of adjacent multibeam elements 120 of the plurality may be equal to an inter-pixel distance (e.g., a center-to-center distance) between a corresponding adjacent pair of multiview pixels 106, e.g., represented by light valve sets. For example, as illustrated in FIG. 3A, a center-to-center distance d between the first multibeam element 120a and the second multibeam element 120b is substantially equal to a center-to-center distance D between the first light valve set 108a and the second light valve set 108b. In other embodiments (not illustrated), the relative center-to-center distances of pairs of multibeam elements 120 and corresponding light valve sets may differ, e.g., the multibeam elements 120 may have an inter-element spacing (i.e., center-to-center distance d) that is one of greater than or less than a spacing (i.e., center-to-center distance D) between light valve sets representing multiview pixels 106.

In some embodiments, a shape of the multibeam element 120 is analogous to a shape of the multiview pixel 106 or equivalently, a shape of a set (or 'sub-array') of the light valves 108 corresponding to the multiview pixel 106. For example, the multibeam element 120 may have a square shape and the multiview pixel 106 (or an arrangement of a corresponding set of light valves 108) may be substantially square. In another example, the multibeam element 120 may have a rectangular shape, i.e., may have a length or longitudinal dimension that is greater than a width or transverse dimension. In this example, the multiview pixel 106 (or equivalently the arrangement of the set of light valves 108) corresponding to the multibeam element 120 may have an analogous rectangular shape. FIG. 3B illustrates a top or plan view of square-shaped multibeam elements 120 and corresponding square-shaped multiview pixels 106 comprising square sets of light valves 108. In yet other examples (not illustrated), the multibeam elements 120 and the corresponding multiview pixels 106 have various shapes including or at least approximated by, but not limited to, a triangular shape, a hexagonal shape, and a circular shape.

Further (e.g., as illustrated in FIG. 3A), each multibeam element 120 is configured to provide coupled-out light beams 102 to one and only one multiview pixel 106, according to some embodiments. In particular, for a given one of the multibeam elements 120, the coupled-out light beams 102 having different principal angular directions corresponding to the different views of the multiview display are substantially confined to a single corresponding multiview pixel 106 and the sub-pixels 106' thereof, i.e., a single set of light valves 108 corresponding to the multibeam element 120, as illustrated in FIG. 3A. As such, each multibeam element 120 of the multiview backlight 100 provides a corresponding set of coupled-out light beams 102 that has a set of the different principal angular directions corresponding to the different views of the multiview display (i.e., the set of coupled-out light beams 102 contains a light beam having a direction corresponding to each of the different view directions).

According to various embodiments, the multibeam elements 120 may comprise any of a number of different structures configured to couple out a portion of the guided light 104. For example, the different structures may include, but are not limited to, diffraction gratings, micro-reflective elements, micro-refractive elements, or various combinations thereof. In some embodiments, the multibeam element 120 comprising a diffraction grating is configured to diffractively couple out the guided light portion as the plurality of coupled-out light beams 102 having the different principal angular directions. In other embodiments, the multibeam element 120 comprising a micro-reflective element is configured to reflectively couple out the guided light portion as the plurality of coupled-out light beams 102, or the multibeam element 120 comprising a micro-refractive element is configured to couple out the guided light portion as the plurality of coupled-out light beams 102 by or using refraction (i.e., refractively couple out the guided light portion).

Figure 4A:
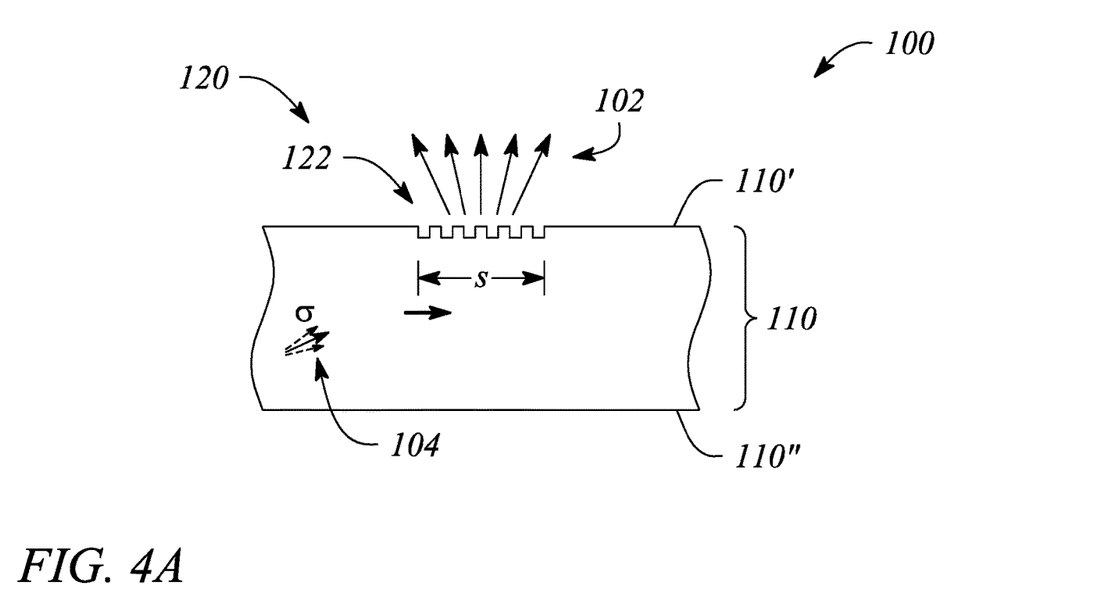
FIG. 4A illustrates a cross sectional view of a portion of a multiview backlight including a multibeam element in an example, according to an embodiment consistent with the principles described herein.
Figure 4B:
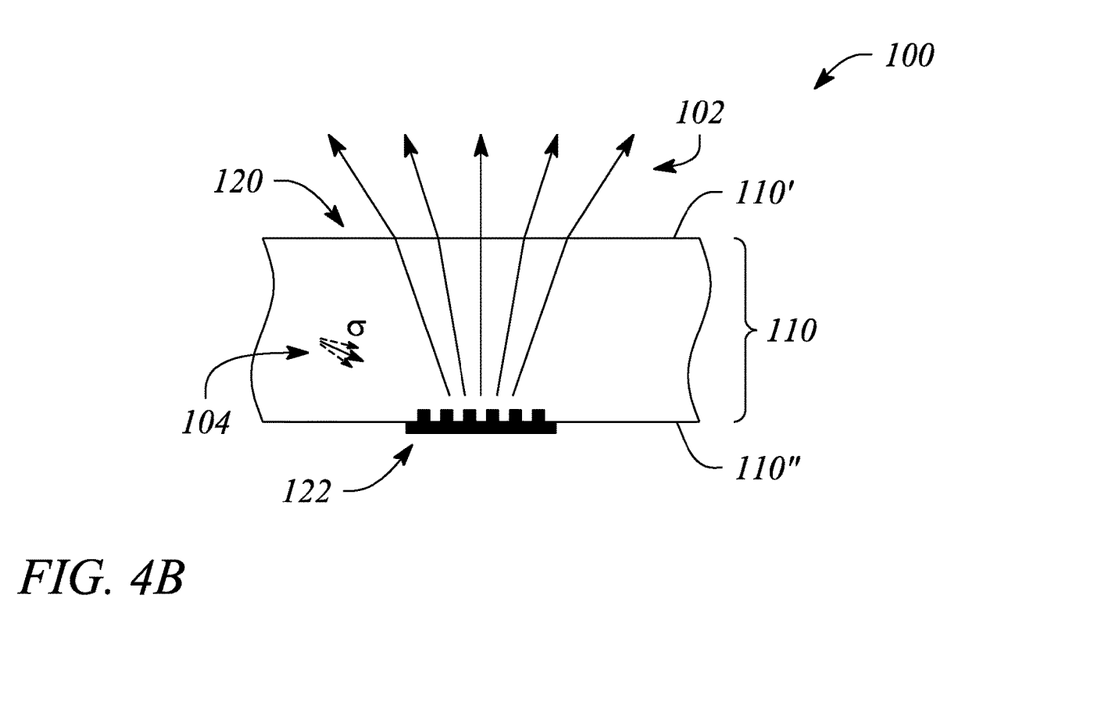
FIG. 4B illustrates a cross sectional view of a portion of a multiview backlight including a multibeam element in an example, according to another embodiment consistent with the principles described herein.

FIG. 4A illustrates a cross sectional view of a portion of a multiview backlight 100 including a multibeam element 120 in an example, according to an embodiment consistent with the principles described herein. FIG. 4B illustrates a cross sectional view of a portion of a multiview backlight 100 including a multibeam element 120 in an example, according to another embodiment consistent with the principles described herein. In particular, FIGS. 4A-4B illustrate the multibeam element 120 of the multiview backlight 100 comprising a diffraction grating 122. The diffraction grating 122 is configured to diffractively couple out a portion of the guided light 104 as the plurality of coupled-out light beams 102. The diffraction grating 122 comprises a plurality of diffractive features spaced apart from one another by a diffractive feature spacing or a diffractive feature or grating pitch configured to provide diffractive coupling out of the guided light portion. According to various embodiments, the spacing or grating pitch of the diffractive features in the diffraction grating 122 may be sub-wavelength (i.e., less than a wavelength of the guided light).

In some embodiments, the diffraction grating 122 of the multibeam element 120 may be located at or adjacent to a surface of the light guide 110. For example, the diffraction grating 122 may be at or adjacent to the first surface 110' of the light guide 110, as illustrated in FIG. 4A. The diffraction grating 122 at light guide first surface 110' may be a transmission mode diffraction grating configured to diffractively couple out the guided light portion through the first surface 110' as the coupled-out light beams 102. In another example, as illustrated in FIG. 4B, the diffraction grating 122 may be located at or adjacent to the second surface 110" of the light guide 110. When located at the second surface 110", the diffraction grating 122 may be a reflection mode diffraction grating. As a reflection mode diffraction grating, the diffraction grating 122 is configured to both diffract the guided light portion and reflect the diffracted guided light portion toward the first surface 110' to exit through the first surface 110' as the diffractively coupled-out light beams 102. In other embodiments (not illustrated), the diffraction grating may be located between the surfaces of the light guide 110, e.g., as one or both of a transmission mode diffraction grating and a reflection mode diffraction grating. Note that, in some embodiments described herein, the principal angular directions of the coupled-out light beams 102 may include an effect of refraction due to the coupled-out light beams 102 exiting the light guide 110 at a light guide surface. For example, FIG. 4B illustrates refraction (i.e., bending) of the coupled-out light beams 102 due to a change in refractive index as the coupled-out light beams 102 cross the first surface 110', by way of example and not limitation. Also see FIGS. 5A and 5B, described below.

According to some embodiments, the diffractive features of the diffraction grating 122 may comprise one or both of grooves and ridges that are spaced apart from one another. The grooves or the ridges may comprise a material of the light guide 110, e.g., may be formed in a surface of the light guide 110. In another example, the grooves or the ridges may be formed from a material other than the light guide material, e.g., a film or a layer of another material on a surface of the light guide 110.

In some embodiments, the diffraction grating 122 of the multibeam element 120 is a uniform diffraction grating in which the diffractive feature spacing is substantially constant or unvarying throughout the diffraction grating 122. In other embodiments, the diffraction grating 122 is a chirped diffraction grating. By definition, the 'chirped' diffraction grating is a diffraction grating exhibiting or having a diffraction spacing of the diffractive features (i.e., the grating pitch) that varies across an extent or length of the chirped diffraction grating. In some embodiments, the chirped diffraction grating may have or exhibit a chirp of the diffractive feature spacing that varies linearly with distance. As such, the chirped diffraction grating is a 'linearly chirped' diffraction grating, by definition. In other embodiments, the chirped diffraction grating of the multibeam element 120 may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

Figure 5A:
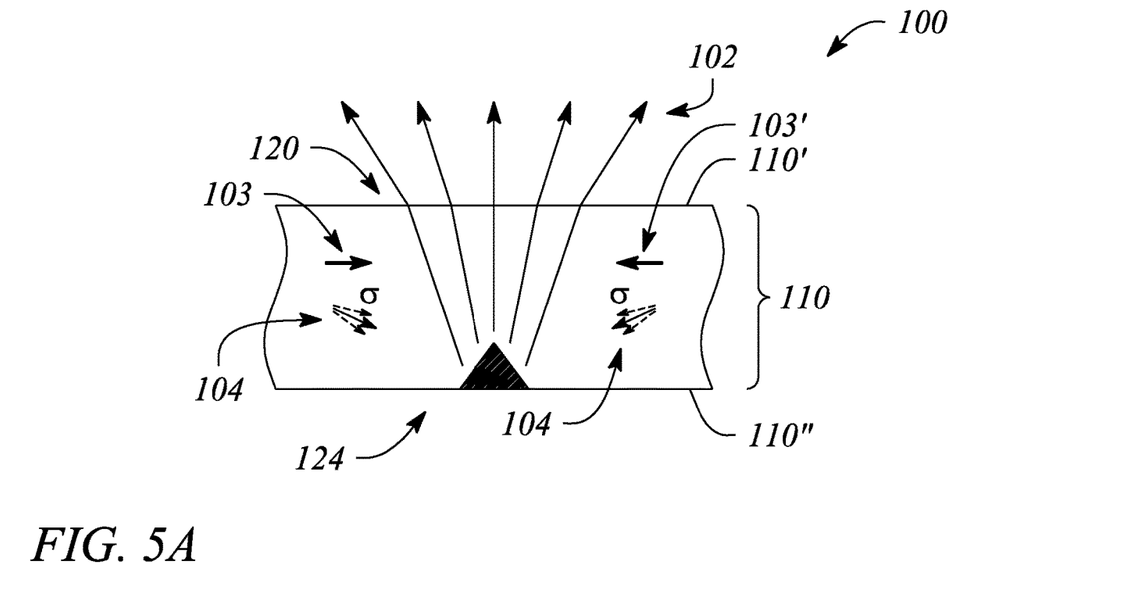
FIG. 5A illustrates a cross sectional view of a portion of a multiview backlight including a multibeam element in an example, according to another embodiment consistent with the principles described herein.
Figure 5B:
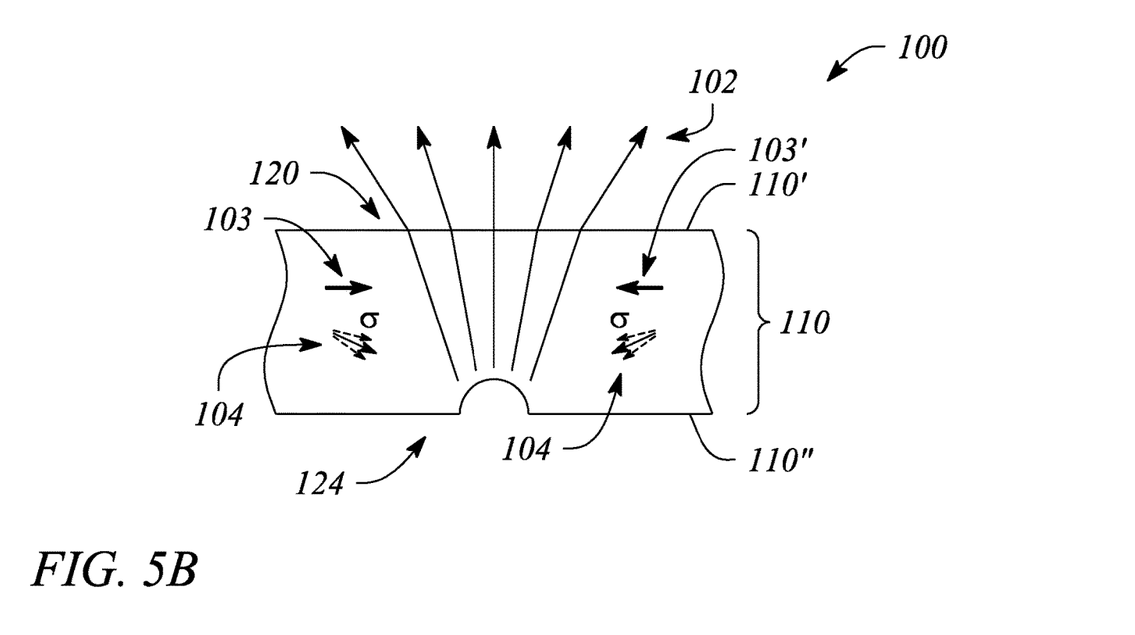
FIG. 5B illustrates a cross sectional view of a portion of a multiview backlight including a multibeam element in an example, according to another embodiment consistent with the principles described herein.

FIG. 5A illustrates a cross sectional view of a portion of a multiview backlight 100 including a multibeam element 120 in an example, according to another embodiment consistent with the principles described herein. FIG. 5B illustrates a cross sectional view of a portion of a multiview backlight 100 including a multibeam element 120 in an example, according to another embodiment consistent with the principles described herein. In particular, FIGS. 5A and 5B illustrate various embodiments of the multibeam element 120 comprising a micro-reflective element. Micro-reflective elements used as or in the multibeam element 120 may include, but are not limited to, a reflector that employs a reflective material or layer thereof (e.g., a reflective metal) or a reflector based on total internal reflection (TIR). According to some embodiments (e.g., as illustrated in FIGS. 5A-5B), the multibeam element 120 comprising the micro-reflective element may be located at or adjacent to a surface (e.g., the second surface 110″) of the light guide 110. In other embodiments (not illustrated), the micro-reflective element may be located within the light guide 110 between the first and second surfaces 110′, 110″.

For example, FIG. 5A illustrates the multibeam element 120 comprising a micro-reflective element 124 having reflective facets (e.g., a 'prismatic' micro-reflective element) located adjacent to the second surface 110″ of the light guide 110. The facets of the illustrated prismatic micro-reflective element 124 are configured to reflect (i.e., reflectively couple) the portion of the guided light 104 out of the light guide 110. The facets may be slanted or tilted (i.e., have a tilt angle) relative to a propagation direction of the guided light 104 to reflect the guided light portion out of light guide 110, for example. The facets may be formed using a reflective material within the light guide 110 (e.g., as illustrated in FIG. 5A) or may be surfaces of a prismatic cavity in the second surface 110″, according to various embodiments. When a prismatic cavity is employed, either a refractive index change at the cavity surfaces may provide reflection (e.g., TIR reflection) or the cavity surfaces that form the facets may be coated by a reflective material to provide reflection, in some embodiments.

In another example, FIG. 5B illustrates the multibeam element 120 comprising a micro-reflective element 124 having a substantially smooth, curved surface such as, but not limited to, a semi-spherical micro-reflective element 124. A specific surface curve of the micro-reflective element 124 may be configured to reflect the guided light portion in different directions depending on a point of incidence on the curved surface with which the guided light 104 makes contact, for example. As illustrated in FIGS. 5A and 5B, the guided light portion that is reflectively coupled out of the light guide 110 exits or is emitted from the first surface 110′, by way of example and not limitation. As with the prismatic micro-reflective element 124 in FIG. 5A, the micro-reflective element 124 in FIG. 5B may be either a reflective material within the light guide 110 or a cavity (e.g., a semi-circular cavity) formed in the second surface 110″, as illustrated in FIG. 5B by way of example and not limitation. FIGS. 5A and 5B also illustrate the guided light 104 having two propagation directions 103, 103′ (i.e., illustrated as bold arrows), by way of example and not limitation. Using two propagation directions 103, 103′ may facilitate providing the plurality of coupled-out light beams 102 with symmetrical principal angular directions, for example.

Figure 6:
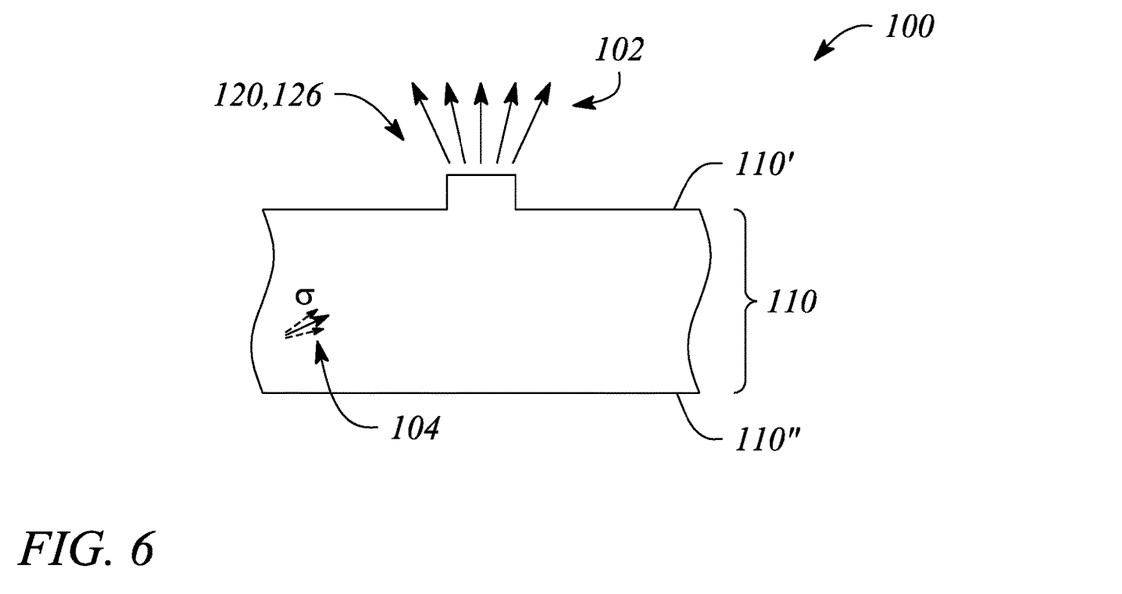
FIG. 6 illustrates a cross sectional view of a portion of a multiview backlight including a multibeam element in an example, according to another embodiment consistent with the principles described herein.

FIG. 6 illustrates a cross sectional view of a portion of a multiview backlight 100 including a multibeam element 120 in an example, according to another embodiment consistent with the principles described herein. In particular, FIG. 6 illustrates a multibeam element 120 comprising a micro-refractive element 126. According to various embodiments, the micro-refractive element 126 is configured to refractively couple out a portion of the guided light 104 from the light guide 110. That is, the micro-refractive element 126 is configured to employ refraction (e.g., as opposed to diffraction or reflection) to couple out the guided light portion from the light guide 110 as the coupled-out light beams 102, as illustrated in FIG. 6. The micro-refractive element 126 may have various shapes including, but not limited to, a semi-spherical shape, a rectangular shape or a prismatic shape (i.e., a shape having sloped facets). According to various embodiments, the micro-refractive element 126 may extend or protrude out of a surface (e.g., the first surface 110′) of the light guide 110, as illustrated, or may be a cavity in the surface (not illustrated). Further, the micro-refractive element 126 may comprise a material of the light guide 110, in some embodiments. In other embodiments, the micro-refractive element 126 may comprise another material adjacent to, and in some examples, in contact with the light guide surface.

Referring again to FIG. 3A, the multiview backlight 100 may further comprise a light source 130. According to various embodiments, the light source 130 is configured to provide the light to be guided within light guide 110. In particular, the light source 130 may be located adjacent to an entrance surface or end (input end) of the light guide 110. In various embodiments, the light source 130 may comprise substantially any source of light (e.g., optical emitter) including, but not limited to, one or more light emitting diodes (LEDs) or a laser (e.g., laser diode). In some embodiments, the light source 130 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 130 may be a substantially broadband light source configured to provide substantially broadband or polychromatic light. For example, the light source 130 may provide white light. In some embodiments, the light source 130 may comprise a plurality of different optical emitters configured to provide different colors of light. The different optical emitters may be configured to provide light having different, color-specific, non-zero propagation angles of the guided light corresponding to each of the different colors of light.

In some embodiments, the light source 130 may further comprise a collimator. The collimator may be configured to receive substantially uncollimated light from one or more of the optical emitters of the light source 130. The collimator is further configured to convert the substantially uncollimated light into collimated light. In particular, the collimator may provide collimated light having the non-zero propagation angle and being collimated according to a predetermined collimation factor, according to some embodiments.

Moreover, when optical emitters of different colors are employed, the collimator may be configured to provide the collimated light having one or both of different, color-specific, non-zero propagation angles and having different color-specific collimation factors. The collimator is further configured to communicate the collimated light beam to the light guide 110 to propagate as the guided light 104, described above.

In some embodiments, the multiview backlight 100 is configured to be substantially transparent to light in a direction through the light guide 110 orthogonal to a propagation direction 103, 103' of the guided light 104. In particular, the light guide 110 and the spaced apart plurality of multibeam elements 120 allow light to pass through the light guide 110 through both the first surface 110' and the second surface 110", in some embodiments. Transparency may be facilitated, at least in part, due to both the relatively small size of the multibeam elements 120 and the relative large inter-element spacing (e.g., one-to-one correspondence with multiview pixels 106) of the multibeam element 120. Further, especially when the multibeam elements 120 comprise diffraction gratings, the multibeam elements 120 may also be substantially transparent to light propagating orthogonal to the light guide surfaces 110', 110", according to some embodiments.

In accordance with some embodiments of the principles described herein, a multiview display is provided. The multiview display is configured to emit modulated light beams as pixels of the multiview display. Further, the emitted modulated light beams may be preferentially directed toward a plurality of viewing directions of the multiview display. In some examples, the multiview display is configured to provide or 'display' a 3D or multiview image. Different ones of the modulated, differently directed light beams may correspond to individual pixels of different 'views' associated with the multiview image, according to various examples. The different views may provide a 'glasses free' (e.g., autostereoscopic) representation of information in the multiview image being displayed by the multiview display, for example.

Figure 7:
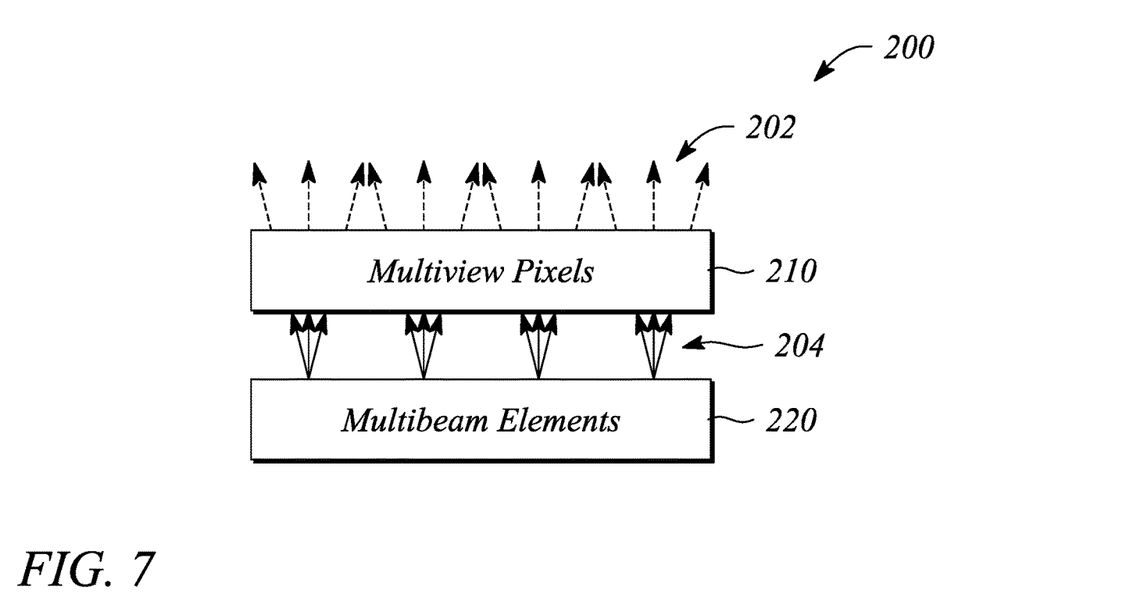
FIG. 7 illustrates a block diagram of a multiview display in an example, according to an embodiment consistent with the principles described herein.

FIG. 7 illustrates a block diagram of a multiview display 200 in an example, according to an embodiment consistent with the principles described herein. According to various embodiments, the multiview display 200 is configured to display a multiview image according to different views in different view directions. In particular, modulated light beams 202 emitted by the multiview display 200 are used to display the multiview image and may correspond to pixels of the different views (i.e., view pixels). The modulated light beams 202 are illustrated as arrows emanating from multiview pixels 210 in FIG. 7. Dashed lines are used for the arrows of the emitted modulated light beams 202 to emphasize the modulation thereof by way of example and not limitation.

The multiview display 200 illustrated in FIG. 7 comprises an array of the multiview pixels 210. The multiview pixels 210 of the array are configured to provide a plurality of different views of the multiview display 200. According to various embodiments, a multiview pixel 210 of the array comprises a plurality of sub-pixels configured to modulate a plurality of light beams 204 and produce the emitted modulated light beams 202. In some embodiments, the multiview pixel 210 is substantially similar to a set of light valves 108 of the array of light valves 108, described above with respect to the multiview backlight 100. In particular, a sub-pixel of the multiview pixel 210 may be substantially similar to the above-described light valve 108. That is, a multiview pixel 210 of the multiview display 200 may comprises a set of light valves (e.g., a set of light valves 108), and a sub-pixel of the multiview pixel 210 may comprise a light valve (e.g., a single light valve 108) of the set.

According to various embodiments, the multiview display 200 illustrated in FIG. 7 further comprises an array of multibeam elements 220. Each multibeam element 220 of the array is configured to provide the plurality of light beams 204 to a corresponding multiview pixel 210. Light beams 204 of the plurality of light beams 204 have different principal angular directions from one another. In particular, the different principal angular directions of the light beams 204 correspond to different view direction of the different views of the multiview display 200.

According to various embodiments, a size of a multibeam element 220 of the multibeam element array is comparable to a size of a sub-pixel of the sub-pixel plurality. For example, the size of the multibeam element 220 may be greater than one half of the sub-pixel size and less than twice the sub-pixel size, in some embodiments. Further, an inter-element distance between multibeam elements 220 of the multibeam element array may correspond to an inter-pixel distance between multiview pixels 210 of the multiview pixel array, according to some embodiments. For example, the inter-element distance between the multibeam elements 220 may be substantially equal to the inter-pixel distance between the multiview pixels 210. In some examples, the inter-element distance between multibeam elements 220 and the corresponding inter-pixel distance between multiview pixels 210 may be defined as a center-to-center distance or an equivalent measure of spacing or distance.

Further, there may be a one-to-one correspondence between the multiview pixels 210 of the multiview pixel array and the multibeam elements 220 of the multibeam element array. In particular, in some embodiments, the inter-element distance (e.g., center-to-center) between the multibeam elements 220 may be substantially equal to the inter-pixel distance (e.g., center-to-center) between the multiview pixels 210. As such, each sub-pixel in the multiview pixel 210 may be configured to modulate a different one of the plurality of light beams 204 provided by a corresponding multibeam element 220. Further, each multiview pixel 210 may be configured to receive and modulate the light beams 204 from one and only one multibeam element 220, according to various embodiments.

In some embodiments, the multibeam element 220 of the multibeam element array may be substantially similar to the multibeam element 120 of the multiview backlight 100, described above. For example, the multibeam element 220 may comprise a diffraction grating substantially similar to the diffraction grating 122, described above, e.g., and illustrated in FIGS. 4A-4B, with respect to the multibeam element 120. In another example, the multibeam element 220 may comprise a micro-reflective element that is substantially similar to the micro-reflective element 124, described above, e.g., and illustrated in FIGS. 5A-5B, with respect to the multibeam element 120. In yet another example, the multibeam element 220 may comprise a micro-refractive element. The micro-refractive element may be substantially similar to the micro-refractive element 126 described above, e.g., and illustrated in FIG. 6, with respect to the multibeam element 120.

In the embodiments having multibeam elements 220 comprising one or more of diffraction gratings, micro-reflective elements and micro-refractive elements, the multiview display 200 may further comprise a light guide configured to guide light. The multibeam elements 220 of the element array may be configured to couple out a portion of the guided light from the light guide as the plurality of light beams 204 provided to the corresponding multiview pixels 210 of the pixel array, according to these embodiments. In particular, the multibeam element 220 may be optically connected to the light guide to couple out the portion of the guided light. In some embodiments, the light guide of the multiview display 200 may be substantially similar to the light guide 110 described above with respect to the multiview backlight 100. Note, a light guide is not explicitly illustrated in FIG. 7.

Further, in some of these embodiments (not illustrated in FIG. 7), the multiview display 200 may further comprise a light source. The light source may be configured to provide the light to the light guide with a non-zero propagation angle and, in some embodiments, is collimated according to a collimation factor to provide a predetermined angular spread of the guided light within the light guide, for example. According to some embodiments, the light source may be substantially similar to the light source 130 of the multiview backlight 100, described above.

In other embodiments, the multibeam elements 220 of the array may be light emitting elements. That is, the multibeam elements 220 may generate and emit their own light as opposed to coupling out a portion of guided light from a light guide, for example. In particular, the multibeam elements 220 may comprise a light source such as, but not limited to, a light emitting diode (LED) or an organic light emitting diode (OLED). The LED, the OLED or the like, serving as the multibeam element 220 may be configured to directly provide the light beams 204 to the multiview pixels 210 for modulation as the light beams 202, according to some embodiments. Further, the LED, the OLED or the like may have a size and an inter-element spacing as described above for the multibeam elements 220.

Figure 8:
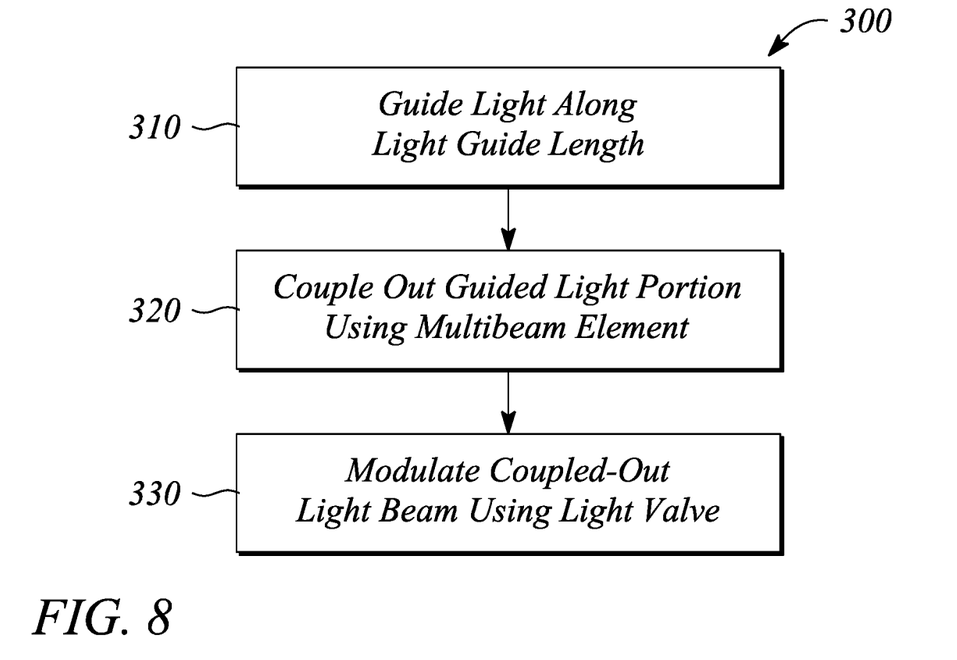
FIG. 8 illustrates a flow chart of a method of multiview backlight operation in an example, according to an embodiment consistent with the principles described herein.

In accordance with other embodiments of the principles described herein, a method of multiview backlight operation is provided. FIG. 8 illustrates a flow chart of a method 300 of multiview backlight operation in an example, according to an embodiment consistent with the principles described herein. As illustrated in FIG. 8, the method 300 of multiview backlight operation comprises guiding 310 light along a length of a light guide. In some embodiments, the light may be guided 310 at a non-zero propagation angle. Further, the guided light may be collimated according to a predetermined collimation factor. According to some embodiments, the light guide may be substantially similar to the light guide 110 described above with respect to the multiview backlight 100.

As illustrated in FIG. 8, the method 300 of multiview backlight operation further comprises coupling 320 a portion of the guided light out of the light guide using a multibeam element to provide a plurality of coupled-out light beams having different principal angular directions from one another. In various embodiments, the principal angular directions of the coupled-out light beams correspond to respective view directions of a multiview display. According to various embodiments, a size of the multibeam element is comparable to a size of a sub-pixel in a multiview pixel of the multiview display. For example, the multibeam element may be greater than one half of the sub-pixel size and less than twice the sub-pixel size.

In some embodiments, the multibeam element is substantially similar to the multibeam element 120 of the multiview backlight 100, described above. For example, the multibeam element may be a member of a plurality or an array of multibeam elements. Further, in some embodiments, the multibeam element may comprise one or more of a diffraction grating, micro-reflective element and a micro-refractive element. In particular, according to some embodiments, the multibeam element used in coupling out 320 guided light may comprise a diffraction grating optically coupled to the light guide to diffractively couple out 320 the guided light portion. The diffraction grating may be substantially similar to the diffraction grating 122 of the multibeam element 120, for example. In another embodiment, the multibeam element may comprise a micro-reflective element optically coupled to the light guide to reflectively couple out 320 the guided light portion. For example, the micro-reflective element may be substantially similar to the micro-reflective element 124 described above with respect to the multibeam element 120. In yet another embodiment, the multibeam element may comprise a micro-refractive element optically coupled to the light guide to refractively couple out 320 the guided light portion. The micro-refractive element may be substantially similar to the micro-refractive element 126 of the multibeam element 120, described above.

In some embodiments (not illustrated), the method 300 of multiview backlight operation further comprises providing light to the light guide using a light source. The provided light may be the guided light that one or both of has a non-zero propagation angle within the light guide and is collimated within the light guide according to a collimation factor to provide a predetermined angular spread of the guided light within the light guide. In some embodiments, the light source may be substantially similar to the light source 130 of the multiview backlight 100, described above.

In some embodiments, the method 300 of multiview backlight operation further comprises modulating 330 the coupled-out light beams using light valves configured as a multiview pixel of a multiview display. According to some embodiments, a light valve of a plurality or array of light valves corresponds to the sub-pixel of the multiview pixels. That is, the multibeam element may have a size comparable to a size of the light valve or a center-to-center spacing between the light valves of the plurality, for example. According to some embodiments, the plurality of light valves may be substantially similar to the array of light valves 108 described above with respect to FIGS. 3A-3C and the multiview backlight 100. In particular, different sets of light valves may correspond to different multiview pixels in a manner similar to the correspondence of the first and second light valve sets 108a, 108b to different multiview pixels 106, as described above. Further, individual light valves of the light valve array may correspond to sub-pixels of the multiview pixels as a light valve 108 corresponds to a sub-pixel 106' in the above-reference discussion of FIGS. 3A-3C.

Thus, there have been described examples and embodiments of a multiview backlight, a method of multiview backlight operation, and a multiview display that has multiview pixels comprising sub-pixels. The multiview backlight, the method and the multiview display employ a multibeam element to provide light beams corresponding to plurality of different views of a multiview image. The multibeam element is comparable in size to a sub-pixel of a multiview pixel of the display. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview backlight comprising:
   a light guide configured to guide light in a propagation direction along a length of the light guide; and
   a plurality of multibeam elements spaced apart from one another along the light guide length, a multibeam element of the plurality of multibeam elements being configured to couple out from the light guide a portion of the guided light as a plurality of coupled-out light beams having different principal angular directions corresponding to respective different view directions of a multiview display comprising multiview pixels,
   wherein a size of the multibeam element is comparable to a size of a sub-pixel in a multiview pixel of the multiview display, and
   wherein an inter-element distance between a pair of multibeam elements of the plurality of multibeam elements is equal to an inter-pixel distance between a corresponding pair of multiview pixels.

2. The multiview backlight of claim 1, wherein a relationship between the multibeam elements of the plurality of multibeam elements and corresponding multiview pixels of the multiview display is a one-to-one relationship.

3. The multiview backlight of claim 1, wherein the size of the multibeam element is between fifty percent and two hundred percent of the sub-pixel size.

4. The multiview backlight of claim 1, wherein a shape of the multibeam element is analogous to a shape of the multiview pixel.

5. The multiview backlight of claim 1, wherein the multibeam element comprises a diffraction grating configured to diffractively couple out the portion of the guided light as the plurality of coupled-out light beams.

6. The multiview backlight of claim 1, wherein the multibeam element comprises one or both of a micro-reflective element and a micro-refractive element, the micro-reflective element being configured to reflectively couple out a portion of the guided light, the micro-refractive element being configured to refractively couple out a portion of the guided light.

7. The multiview backlight of claim 1, wherein the multibeam element is located one of at a first surface and at a second surface of the light guide, the multibeam element being configured to couple out the guided light portion through the first surface.

8. The multiview backlight of claim 1, further comprising a light source optically coupled to an input of the light guide, the light source being configured to provide the guided light one or both of having a non-zero propagation angle and being collimated according to a predetermined collimation factor.

9. The multiview backlight of claim 1, wherein a combination of the light guide and the plurality of multibeam elements is configured to be substantially optically transparent through the light guide in a direction orthogonal to the propagation direction of the guided light.

10. A multiview display comprising the multiview backlight of claim 1, the multiview display further comprising an array of light valves configured to modulate light beams of the coupled-out light beam plurality, a light valve of the array corresponding to the sub-pixel, a set of light valves of the array corresponding to the multiview pixel of the multiview display.

11. A multiview display comprising:
    an array of multiview pixels configured to provide a plurality of different views of the multiview display, a multiview pixel comprising a plurality of sub-pixels configured to modulate a plurality of light beams; and
    an array of multibeam elements, each multibeam element being configured to provide the plurality of light beams to a corresponding multiview pixel, light beams of the plurality of light beams having different principal angular directions from one another corresponding to different view directions of the different views,
    wherein a size of a multibeam element of the multibeam element array is comparable to a size of a sub-pixel of the sub-pixel plurality, an inter-element distance between adjacent multibeam elements of the multibeam element array corresponds to an inter-pixel distance between adjacent multiview pixels of the multiview pixel array, and
    wherein a constant inter-element distance between the multibeam elements is less than or equal to a constant inter-pixel distance between the multiview pixels.

12. The multiview display of claim 11, further comprising a light guide configured to guide light, wherein the multibeam element of the multibeam element array is configured to couple out from the light guide a portion of the guided light as the plurality of light beams provided to the corresponding multiview pixel.

13. The multiview display of claim 12, wherein the multibeam element comprises one of a diffraction grating, a micro-reflective element and a micro-refractive element optically connected to the light guide to couple out the portion of the guided light.

14. The multiview display of claim 12, further comprising a light source configured to provide the light to the light guide, the guided light having a non-zero propagation angle and being collimated according to a collimation factor to provide a predetermined angular spread of the guided light within the light guide.

15. The multiview display of claim 11, wherein the multiview pixel of the multiview pixel array comprises a set of light valves, a sub-pixel of the multiview pixel comprising a light valve of the set.

16. A method of multiview backlight operation, the method comprising:
    guiding light in a propagation direction along a length of a light guide; and
    coupling a portion of the guided light out of the light guide using a multibeam element to provide a plurality of coupled-out light beams having different principal angular directions corresponding to respective different view directions of a multiview display,
    wherein a size of the multibeam element is comparable to a size of a sub-pixel in a multiview pixel of the multiview display, and
    wherein an inter-element distance between a pair of multibeam elements of the plurality of multibeam elements is equal to an inter-pixel distance between a corresponding pair of multiview pixels.

17. The method of multiview backlight operation of claim 16, wherein the multibeam element comprises a diffraction grating optically coupled to the light guide to diffractively couple out the guided light portion.

18. The method of multiview backlight operation of claim 16, further comprising modulating the coupled-out light beams using a plurality of light valves configured as the multiview pixel, a light valve of the light valve plurality corresponding to the sub-pixel of the multiview pixel.

* * * * *